United States Patent
Seki et al.

(10) Patent No.: US 7,742,184 B2
(45) Date of Patent: Jun. 22, 2010

(54) DATA TRANSMISSION/RECEPTION SYSTEM THAT INFORMS A USER THAT IMAGE DATA HAS BEEN TRANSMITTED

(75) Inventors: Takao Seki, Nagoya (JP); Koshi Fukazawa, Nagoya (JP); Kiyotaka Ohara, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1276 days.

(21) Appl. No.: 10/238,621

(22) Filed: Sep. 11, 2002

(65) Prior Publication Data
US 2003/0048484 A1 Mar. 13, 2003

(30) Foreign Application Priority Data
Sep. 12, 2001 (JP) .............................. 2001-276652

(51) Int. Cl.
*G06F 3/12* (2006.01)
(52) U.S. Cl. ................ 358/1.15; 358/400; 358/402; 358/407; 358/1.16; 358/1.14; 358/1.13; 358/474; 358/444; 709/217; 709/238; 709/239; 379/102.02; 379/100.02; 455/414.2; 455/556.2
(58) Field of Classification Search ........... 348/400, 348/402, 407; 358/402, 407, 400, 1.15, 1.16, 358/1.14, 1.13, 474, 444; 709/217, 238, 709/239; 379/102.02, 100.02; 455/414.2, 455/556.2
See application file for complete search history.

(56) References Cited

U.S. PATENT DOCUMENTS

| | | | | |
|---|---|---|---|---|
| 5,257,112 A | * | 10/1993 | Okada ...................... 358/402 |
| 5,283,665 A | * | 2/1994 | Ogata ...................... 358/434 |
| 5,668,640 A | | 9/1997 | Nozawa et al. |
| 5,881,233 A | * | 3/1999 | Toyoda et al. ............... 709/233 |
| 6,009,442 A | * | 12/1999 | Chen et al. .................. 715/522 |
| 6,020,981 A | | 2/2000 | Ogiyama |
| 6,088,125 A | * | 7/2000 | Okada et al. ................ 358/405 |
| 6,134,017 A | * | 10/2000 | Schlank et al. ............. 358/1.15 |
| 6,313,921 B1 | * | 11/2001 | Kadowaki .................. 358/1.15 |

(Continued)

FOREIGN PATENT DOCUMENTS

EP  0 812 100 A2  12/1997

(Continued)

*Primary Examiner*—David K Moore
*Assistant Examiner*—Benjamin O Dulaney
(74) *Attorney, Agent, or Firm*—Oliff & Berridge, PLC

(57) ABSTRACT

A data transmission/reception system provides the recipient of image data with flexible options for handling the image data. The system transmits notification mail to a cellular phone owned by the recipient when transmitting facsimile data from a transmitting facsimile machine to a receiving facsimile machine. The recipient transmits a command from the cellular phone indicating how the facsimile data received by the receiving facsimile machine should be handled. In response to the command received from the cellular phone, the receiving facsimile machine either forms an image based on the facsimile data on paper or forwards the facsimile data to another facsimile machine near the recipient. Accordingly, the recipient can transmit a forwarding command instructing the receiving facsimile machine to transmit the facsimile data to a facsimile machine nearby when the recipient is in a remote location, thereby enabling the recipient to view an image based on the facsimile data at any time.

13 Claims, 11 Drawing Sheets

U.S. PATENT DOCUMENTS

| | | | |
|---|---|---|---|
| 6,359,974 B1* | 3/2002 | Ishibashi | 379/100.06 |
| 6,421,536 B1* | 7/2002 | Uranaka et al. | 455/417 |
| 6,430,601 B1* | 8/2002 | Eldridge et al. | 709/206 |
| 6,721,059 B1* | 4/2004 | Sturgeon et al. | 358/1.15 |
| 6,771,382 B1* | 8/2004 | Misawa et al. | 358/1.15 |
| 6,980,319 B2* | 12/2005 | Ohta | 358/1.18 |
| 6,987,580 B2* | 1/2006 | Watanabe et al. | 358/1.15 |
| 7,023,573 B2* | 4/2006 | Ohhashi et al. | 358/1.15 |
| 7,103,644 B1* | 9/2006 | Zhang et al. | 709/219 |
| 7,224,477 B2* | 5/2007 | Gassho et al. | 358/1.14 |
| 7,239,868 B2 | 7/2007 | Furukawa et al. | |
| 7,259,879 B2* | 8/2007 | Yoshino | 358/1.15 |
| 7,304,752 B2* | 12/2007 | Mizuno | 358/1.14 |
| 2001/0019953 A1 | 9/2001 | Furukawa et al. | |
| 2001/0043344 A1* | 11/2001 | Imai et al. | 358/1.9 |
| 2002/0015175 A1* | 2/2002 | Katsuda | 358/1.15 |
| 2002/0044299 A1* | 4/2002 | Iwase et al. | 358/1.15 |
| 2002/0054329 A1* | 5/2002 | Hiraoka | 358/1.15 |
| 2002/0057452 A1* | 5/2002 | Yoshino | 358/1.15 |
| 2002/0073143 A1* | 6/2002 | Edwards et al. | 709/203 |
| 2002/0075508 A1* | 6/2002 | Luman | 358/1.15 |
| 2002/0114001 A1* | 8/2002 | Oyanagi | 358/1.15 |
| 2002/0146096 A1* | 10/2002 | Agarwal et al. | 379/88.13 |
| 2003/0033451 A1* | 2/2003 | Yoshida et al. | 710/8 |

FOREIGN PATENT DOCUMENTS

| | | |
|---|---|---|
| EP | 0 835 011 A1 | 4/1998 |
| EP | 0 942 580 A2 | 9/1999 |
| EP | 0 944 240 A2 | 9/1999 |
| GB | 2 342 197 A | 4/2000 |
| JP | A-06-030215 | 2/1994 |
| JP | A-11-146117 | 5/1999 |
| JP | A-11-275286 | 10/1999 |
| JP | A-2000-032201 | 1/2000 |
| JP | A-2001-217948 | 8/2001 |

* cited by examiner

DATA TRANSMISSION/RECEPTION SYSTEM THAT INFORMS A USER THAT IMAGE DATA HAS BEEN TRANSMITTED

BACKGROUND OF THE INVENTION

1. Field of the Invention

The present invention relates to a data transmission/reception system for transmitting notification mail to a communication terminal of an intended receiver of the image data notifying the receiver that image data has been transmitted. The present invention also relates to a data transmitter and an image-forming device employed by this system.

2. Description of the Related Art

When transmitting image data by a facsimile transmission, conventional data transmission/reception systems have employed a function to transmit notification mail to a communication terminal (cellular phone, personal computer, or the like) of an intended receiver of image data (that is, the image formed based on the image data) indicating that the image data has been transmitted. These systems are convenient in that a user can learn that image data has been received by the user's facsimile without periodically going to the facsimile to check whether image data has been received or not.

The disadvantage of this data transmission/reception system, however, is that the user cannot immediately view the image, even after receiving the notification mail, when the notification mail is sent to a mobile terminal such as a cellular phone, or when the user is not near the facsimile at the time. If the image is confidential material in this case, the user may not be able to prevent a third party from viewing the confidential image, even though the user receives notification mail.

SUMMARY OF THE INVENTION

In view of the foregoing, it is an object of the present invention to provide a data transmission/reception system capable of receiving image data flexibly.

Another object of the present invention is to provide a data transmitter, an image-forming device, and a relay device employed by the data transmission/reception system.

These objects and others will be attained by a data transmission/reception system, according to a first aspect of the present invention, comprising an image-forming device for forming an image on a recording paper based on image data; and a data transmitter for transmitting image data to the image-forming device via a data transmission network. When transmitting the image data, the data transmitter transmits notification mail via a mail communication network to a communication terminal of an intended recipient. The notification mail indicates that image data has been transmitted to the image-forming device. The recipient transmits a command to the image-forming device from the recipient's transmission terminal via a command communication network, and the image-forming device selectively executes one of a plurality of processes according to the received command. The plurality of processes includes at least one of the following processes: an image-forming process for forming an image based on the image data, a data deletion process for deleting image data from a storage device, and a data forwarding process for forwarding the image data to another image-forming device.

Accordingly, by using the data transmission/reception system of the present invention, the user receiving the notification mail can flexibly exchange image data simply by transmitting commands to the image processing device in order to process image data with the image processing device, delete image data from the storage device, or forward the image data to another image processing device. More specifically, the recipient can view an image based on the transmitted image data at any time even from a remote location in relation to the image-forming device by transmitting a command to the image-forming device instructing that device to forward the image data to another image-forming device accessible to the recipient. Furthers the recipient can instruct the image-forming device to form the image on a recording paper by transmitting a command to the image-forming device. The recipient can also prevent a third party from viewing a confidential image by transmitting a command to the image-forming device instructing that device to delete the image data from the storage device.

The data transmitter in the data transmission/reception system described above for transmitting image data to the image-forming device is preferably provided with an image data transmission device for transmitting image data to the image-forming device via a data transmission network; and a notification mail transmission device for transmitting notification mail to the recipient's communication terminal via a mail communication network. The notification mail indicates that the image data transmission device has transmitted image data for the receiver.

Preferably, the image-forming device that receives image data transferred from the data transmission device in the data transmission/reception system described above is provided with an image data receiving function for receiving image data transmitted from the data transmitter via the data transmission network; a command receiving function for receiving commands transmitted from the recipient's communication terminal via the command communication network; and an image data forming function for selectively executing one of a plurality of processes, including at least one of the following processes: an image-forming process for forming an image based on the image data, a data deletion process for deleting image data from the storage device, and a data forwarding process for forwarding the image data to another image-forming device.

According to a second aspect of the present invention, a data transmission/reception system comprises an image-forming device for forming images on a recording paper based on image data; and a data transmitter for transmitting image data to the image-forming device via a data transmission network. After receiving image data from the data transmitter, the image-forming device transmits a notification mail via a mail communication network to a communication terminal of the intended recipient of the image. The notification mail indicates that image data has been received. Subsequently, the image-forming device selectively executes one of a plurality of processes according to commands that have been transmitted from the communication terminal via the command communication network. The plurality of processes include at least one of the following processes: an image-forming process for forming an image based on the image data, a data deletion process for deleting image data from a storage device, and a data forwarding process for forwarding the image data to another image-forming device.

The data transmission/reception system described above differs from the data transmission/reception system according to the first aspect of the present invention mentioned earlier in that the system transmits notification mail via the mail communication network indicating that image data has been received to the recipient's communication terminal after the image-forming device receives image data transmitted from the data transmitter.

Accordingly, the same effects can be obtained by using the data transmission/reception system according to the second aspect of the present invention as with that according to the first aspect of the present invention described above. Further, in the data transmission/reception system according to the first aspect of the present invention, a function is added to the data transmitter for transmitting notification mail, while another function is added to the image-forming device for processing image data according to commands. However, the same effects obtained by this data transmission/reception system can also be obtained by the system according to the second aspect of the present invention, wherein both of these functions are added to the image-forming device (that is, neither function is incorporated in the data transmitter).

Preferably, the image-forming device in the data transmission/reception system according to the second aspect of the present invention is provided with an image data receiving device for receiving image data transmitted from the data transmitter via the data transmission network; a notification mail transmitting device for transmitting notification mail via a mail communication network to the communication terminal of the recipient to which the data was transmitted, after the data receiving function receives image data, to indicate that image data has been received; a command receiving device for receiving commands transmitted from the recipient's communication terminal via the command communication network after the mail transmitting function transmits notification mail; and an image data forming function for selectively executing one of a plurality of processes, including at least one of the following processes: an image-forming process for forming an image based on the image data, a data deletion process for deleting image data from the storage device, and a data forwarding process for forwarding the image data to another image-forming device.

According to a third aspect of the present invention, a data transmission/reception system comprises an image forming device for forming images on a recording paper based on image data; and a data transmitter for transmitting image data to the image-forming device via a data transmission network. A communication line is established between the data transmitter and the image-forming device via the data communication network. After confirming a request from the data transmitter to transmit image data, the image-forming device transmits a notification mail via a mail communication network to a communication terminal possessed by the intended recipient of the image. The notification mail indicates that there has been a request to transmit image data. After establishing a communication line with the image-forming device via the data communication network and sending a request to the image-forming device to receive image data, the data transmitter selectively executes one of a plurality of processes according to a command in the notification mail that has been transmitted from the communication terminal via the command communication network. The plurality of processes include at least one of the following processes: a transmission process for transmitting image data to the image-forming device, a transmission cancellation process for canceling the transmission of image data to the image-forming device, and a data forwarding process for forwarding the image data to another image-forming device.

With the data transmission/reception system described above, image data is transmitted to the image-forming device only when such transmission is required. Image data can be flexibly handled by forwarding the data to another image-forming device. More specifically, when the recipient views a notification mail and determines that it is not necessary to view the image, the recipient can avoid an unnecessary image transmission by sending a command to the data transmitter indicating a wish to cancel the data transmission, thereby reducing communication traffic and avoiding the waste of paper when the recipient is not in the vicinity of the image-forming device, the recipient can transmit a forwarding command to the data transmitter, instructing the transmitter to forward the image data to another image-forming device near at hand, thereby enabling the recipient to quickly view an image based on the transmitted image data.

In the data transmission/reception system described above, a communication line is established between the image-forming device that receives image data from the data transmitter and the data transmitter. The image-forming device can be provided with a notification mail transmitting device for transmitting notification mail. Hence, after the image-forming device receives a request to receive image data, the notification mail transmitting device transmits notification mail via the mail communication network to the communication terminal of the intended recipient of the image data indicating that there has been a request to transmit image data.

The data transmitter of the data transmission/reception system described above can also be provided with a communication line establishing device for establishing a communication line with the image-forming device via the communication network to request the reception of image data from the image-forming device; a command receiving device for receiving a command transmitted from the communication terminal that received notification mail via a command communication network after requesting the reception of image data with the communication line establishing device; and an image data processing device for selectively executing one of a plurality of processes according to commands received by the command receiving function. The plurality of processes includes at least one of the following processes: a transmission process for transmitting image data to the image-forming device, a transmission cancellation process for canceling the transmission of image data to the image-forming device, and a data forwarding process for forwarding the image data to another image-forming device.

According to a fourth aspect of the present invention, a data transmission/reception system comprises an image-forming device for forming images on a recording paper based on image data; and a data transmitter for transmitting image data to the image-forming device via a data transmission network. The data transmitter transmits a notification mail via a mail communication network to a communication terminal of the intended recipient of the image prior to transferring the image data. The notification mail indicates that image data will be transmitted. Subsequently, the data transmitter selectively executes one of a plurality of processes according to commands received from the communication terminal via the command communication network. The plurality of processes includes at least one of the following processes: a transmission process for transmitting image data to the image-forming device, a transmission cancellation process for canceling the transmission of image data to the image-forming device, and a data forwarding process for forwarding the image data to another image-forming device.

The data transmission/reception system according to the fourth aspect of the present invention differs from that according to the third aspect of the present invention in that this system transmits notification mail via the mail communication network to the communication terminal of the recipient indicating that image data will be transmitted before the data transmitter transmits the image data.

Accordingly, the data transmission/reception system according to the fourth aspect of the present invention has the same effects as the system according to the third aspect of the present invention described above. In the data transmission/reception system according to the third aspect of the present invention, it is necessary to add a function to the image-forming device for transmitting notification mail and to add a function to the data transmitter for transmitting image data based on commands or for canceling transmissions. However, the data transmission/reception system according to the fourth aspect of the present invention is configured to obtain the same effects simply by adding both functions to the data transmitter (that is, without adding either function to the image-forming device).

The data transmitter in the data transmission/reception system according to the fourth aspect of the present invention can also be provided with a notification mail transmitting device for transmitting notification mail via the mail communication network to the communication terminal of the recipient to which image data is to be transmitted indicating that image data will be transmitted; a command receiving device for receiving commands transmitted via the command communication network from the communication terminal after the notification mail transmitting device transmits notification mail; and an image data processing device for selectively executing one of a plurality of processes according to commands received by the command receiving function. The plurality of processes includes at least one of the following processes: a transmission process for transmitting image data to the image-forming device, a transmission cancellation process for canceling the transmission of image data to the image-forming device, and a data forwarding process for forwarding the image data to another image-forming device.

In any of the data transmission/reception systems described above, the notification mail transmitted to the communication terminal of the recipient can include command data displaying commands that the recipient can select. By selecting one of the displayed commands, the recipient can transmit a prescribed command from the communication terminal.

By including commands in the notification mail in this way, the recipient can transmit prescribed commands from the communication terminal simply by specifying a command noted in the notification mail. Hence, the present invention greatly simplifies the operations for issuing commands.

To further facilitate command operations for the recipient, it is possible to include the address of a web server offering commands that can be selected by the recipient in the notification mail transferred to the recipient's communication terminal. After receiving the notification mail, the user can connect the communication terminal to the web server by specifying the address included in the notification mail and select a desired command.

In this way, the process for creating notification mail can be made extremely simple, requiring only that an address be inserted in the notification mail. The recipient can perform easy command operations by simply connecting to the web server and specifying a command.

It is also desirable to include thumbnails in the notification mail transmitted to the recipient's communication terminal, wherein the thumbnails are a smaller representation of the image data to be transmitted by the data transmitter. This allows the recipient to see what type of image data is to be transmitted at a glance and quickly determine how to process this image data.

Each of the data transmission/reception system according to the present invention described above can be configured to use a variety of commands based on necessity, such as a command for confirming when image data has been temporarily saved in a recording device or the like provided in the image-forming device, for example. Further, the data communication network, mail communication network, and command communication network in the present invention described above can all be implemented by different networks or by a shared network (the same network). These networks can be broadband networks, such as the Internet, or dial-up networks.

BRIEF DESCRIPTION OF THE DRAWINGS

The aforementioned aspects and other features of the invention are explained in the following description, taken in connection with the accompanying drawing figures wherein.

DESCRIPTION OF THE PREFERRED EMBODIMENTS

The following description will be made for explaining preferred embodiments of the present invention.

1) A Data transmission/reception system of a first embodiment according to the present invention will be described while referring to FIGS. 1-6.

1-1) Overall Construction

Figure 1:
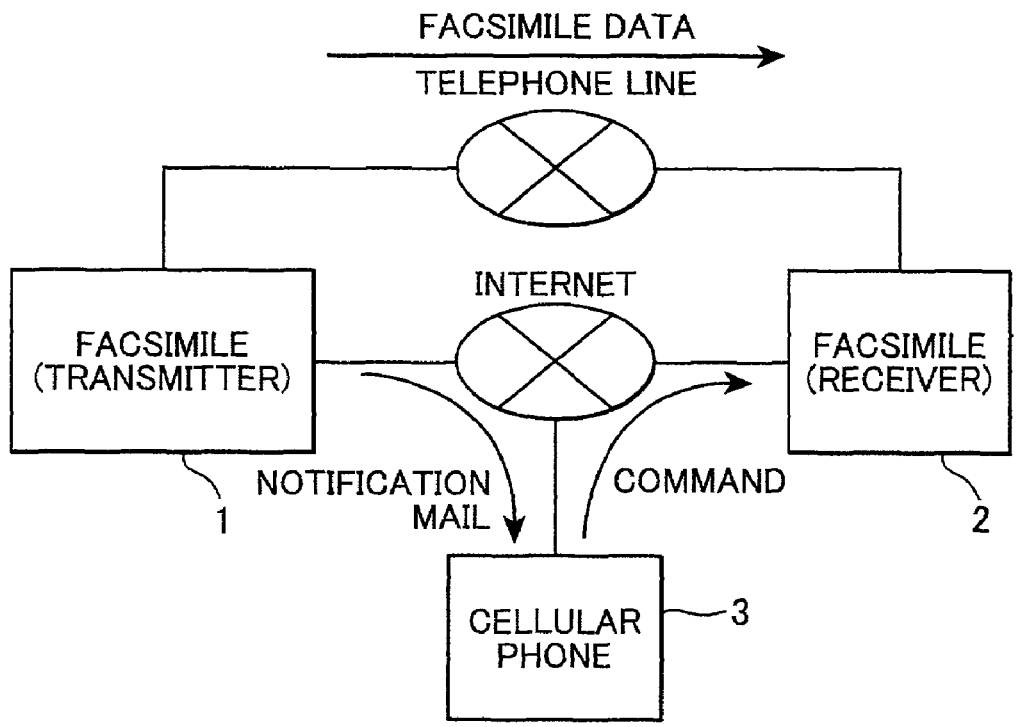
FIG. 1 is a block diagram showing the construction of a data transmission/reception system according to a first embodiment.

As shown in FIG. 1, the data transmission/reception system of the present embodiment comprises at least two facsimile machines 1 and 2 and a cellular phone 3 connected to a telephone line.

The facsimile machines 1, 2 have a scanner (not shown) for scanning an image, and a memory unit (not shown) for storing facsimile data scanned and/or received. The facsimile machines 1, 2 have a printing unit (not shown) for forming an image based on the facsimile data on a sheet. The facsimile machines 1 and 2 transmit and receive facsimile data including image data through the telephone line. The facsimile machines 1, 2 are capable of sending/receiving data and/or email through the Internet. One of the transmitting facsimile machines 1 functions as a transmitting facsimile machine. The other of facsimile machine 2 functions as a receiving facsimile machine.

The cellular phone 3 is capable of sending and receiving data and/or email through the Internet. Generally, the cellular phone 3 is a communication terminal owned by a user of the receiving facsimile machine 2. The user of the cellular phone 3 is an owner and/or user of the receiving facsimile machine 2.

With a data transmission/reception system of this configuration, the transmitting facsimile machine 1 transmits facsimile data to the receiving facsimile machine 2, and transmits email including a notification message to the cellular phone 3. The email including a notification message informs the user of the cellular phone 3 that image data has been transmitted by the transmitting facsimile machine 1. In the present invention, the above email including a notification message is designated as "notification mail" hereinafter.

When the cellular phone 3 receives the notification mail, the user realizes that the facsimile data has been transmitted to the receiving facsimile machine 2. The user specifies a command to the receiving facsimile machine 2 by using the cellular phone 3. And the specified command is sent to the receiving facsimile machine 2. When receiving the command from the cellular phone 3, the receiving facsimile machine 2 operates in response to the command. The receiving facsimile machine 2 may form images based on the facsimile data received from the transmitting facsimile machine 1. Alternatively, the receiving facsimile machine 2 may forward the received facsimile data to another facsimile machine around the user's current position, or delete the received facsimile data from the memory unit.

The following description will be made for explaining the detailed operations of the facsimile machines 1 and 2 and the cellular phone 3.

1-2) Transmission Procedure

Figure 2:
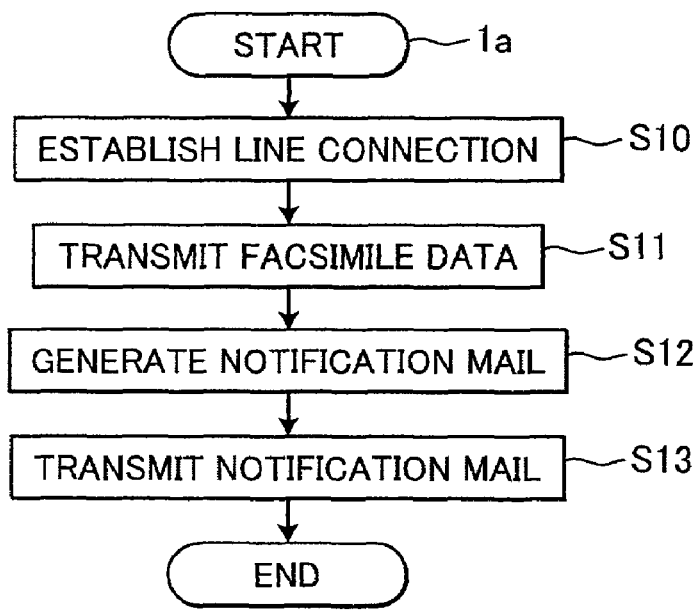
FIG. 2 is a flowchart illustrating a transmission process executed by a transmitting facsimile machine according to the first embodiment.
Figure 3:
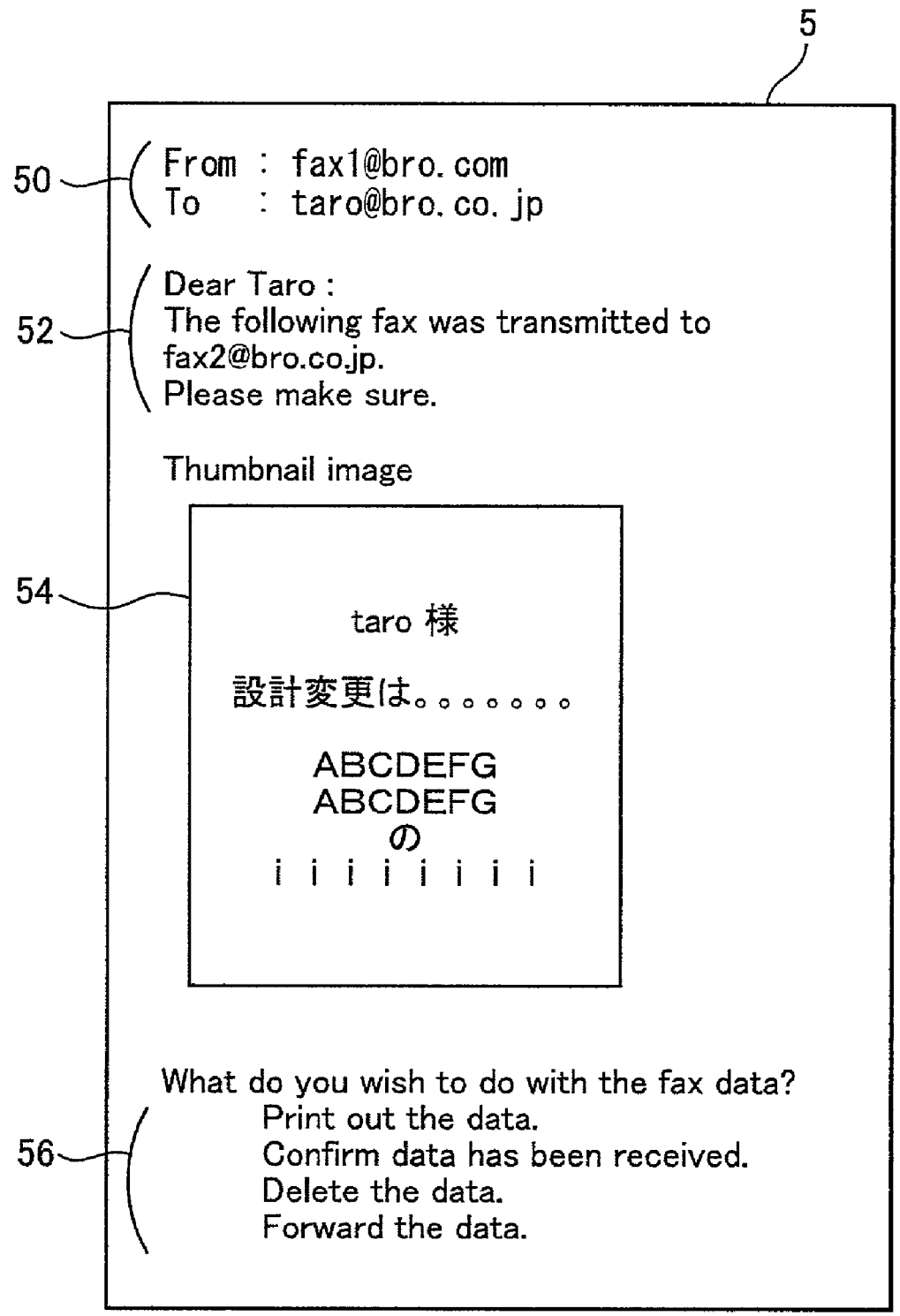
FIG. 3 is an explanatory diagram showing the construction of a notification mail employed in the first embodiment.

Next, the transmission process executed by the transmitting facsimile machine 1 will be described with reference to FIG. 2. In this embodiment, an operator of the transmitting facsimile machine 1 is assumed to know e-mail address of the cellular phone 3 owned by the user of the receiving facsimile machine 2 to which the facsimile data is to be transmitted.

The transmitting facsimile machine 1 initiates a transmission procedure 1a when the transmitting facsimile machine 1 starts sending an image to the receiving facsimile machine 2. In S10, the transmitting facsimile machine 1 first calls the receiving facsimile machine 2 via a telephone line, and then establishes a connection with the receiving facsimile machine 2 via the telephone line. In another embodiment, the transmitting facsimile machine 1 may enable the user to select the facsimile number of the receiving facsimile machine 2 prestored in the transmitting facsimile machine 1. Alternatively, the transmitting facsimile machine 1 may allow the user to enter the facsimile number directly by using dialing buttons prior to switching on the start button.

In S11, the transmitting facsimile machine 1 transmit facsimile data via the established communication line. IN other words, the scanner in the transmitting facsimile machine 1 reads an image from the original. The transmitting facsimile machine 1 then creates facsimile data from the scanned data. The transmitting facsimile, machine 1 then starts sending the facsimile data to the receiving facsimile machine 2. After all the facsimile data is transmitted to the receiving facsimile machine 2 via the telephone line, The transmitting facsimile machine 1 disconnects the line.

In S12, the transmitting facsimile machine 1 executes a process for generating notification mail. In this process, referring to FIG. 5, the transmitting facsimile machine 1 generates a notification mail 5 including email addresses 50 of the operator and the user, a message 52, a thumbnail image 54 based on facsimile data corresponding to the front page of the original that was scanned in S11, a command list 56 for the receiving facsimile machine 2. The email addresses 50 are either email addresses stored in connection with the facsimile number or email addresses separate from the facsimile number that is inputted by the operator. The message 52 may be selected from among a plurality of prestored form messages in the transmitting facsimile machine 1. Alternatively, the message 52 may be original text made at the time of transmission.

In S13, the transmitting facsimile machine 1 executes a process to transmit the generated notification mail 5 to the cellular phone 3 of the user via the Internet. The transmission procedure 1a then ends.

1-3) Command Specifying Procedure

Figure 4:
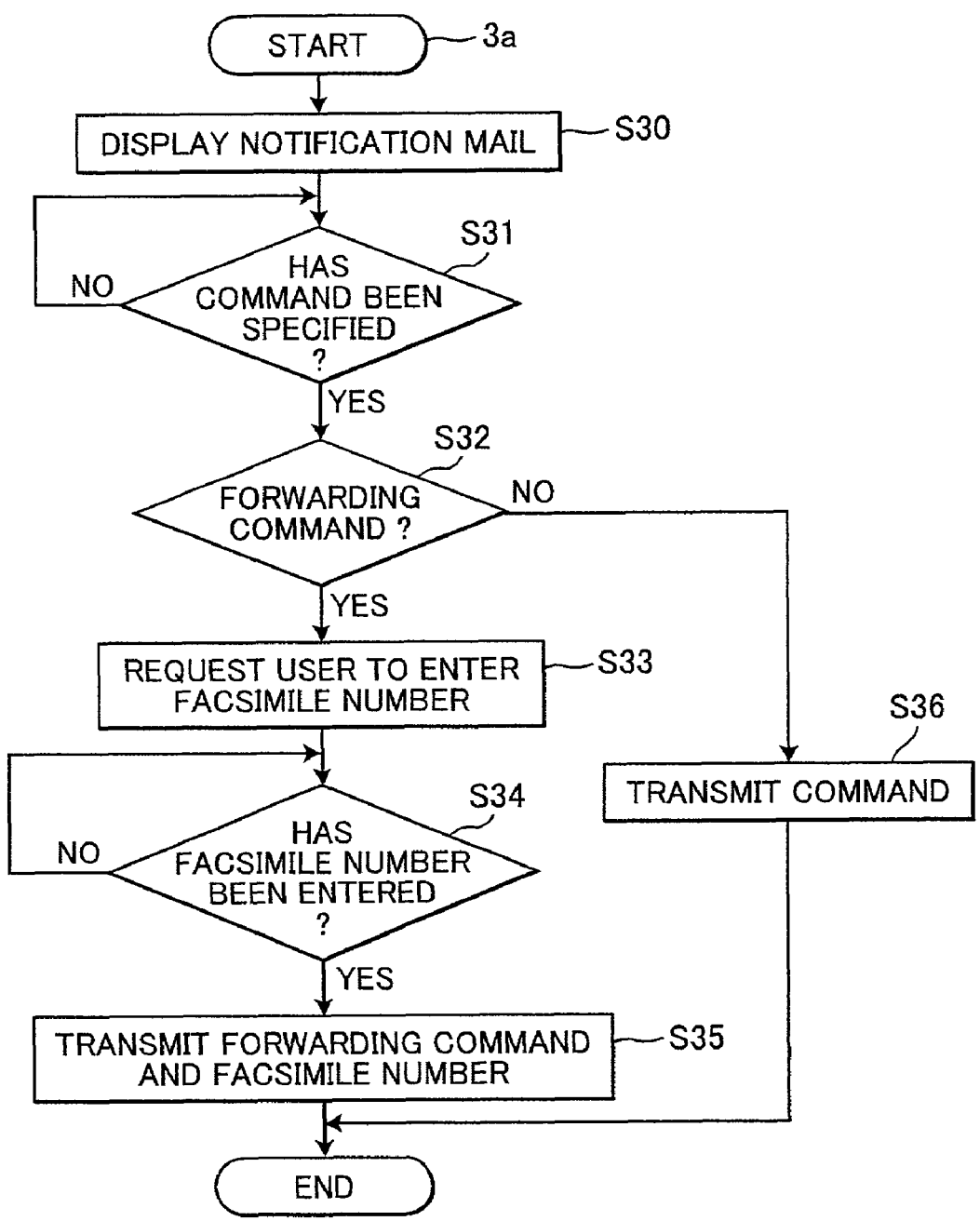
FIG. 4 is a flowchart illustrating a command specifying process executed by a cellular phone according to the first embodiment.
Figure 5:
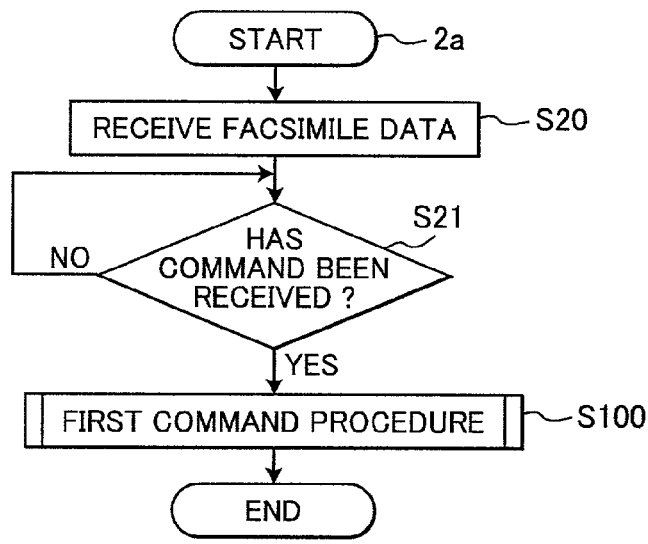
FIG. 5 is a flowchart illustrating a reception process executed by a receiving facsimile machine according to the first embodiment.

Next, a command specifying procedure 3a executed by the cellular phone 3 will be described with reference to FIG. 4.

The command specifying procedure 3a executed by the cellular phone 3 is initiated, when the cellular phone 3 receives a notification mail 5. In S30, the cellular phone 3 displays the received notification mail 5 on its display screen. In S31, the cellular phone 3 waits until the user of the cellular phone 3 has specified one of the commands in the command list 56 displayed in the notification mail 5 by operating the control buttons on the cellular phone 3. When a command is specified (Yes in S31), the cellular phone 3 determines in S32 whether a forwarding command has been specified. If the forwarding command has been specified (Yes in S32), a message is displayed in S33 requesting the user to enter a facsimile number as the destination for forwarding the message. The cellular phone 3 waits in S34 until a facsimile number has been entered. When the facsimile number has been entered (Yes in S34), both the entered facsimile number and the forwarding command are transmitted to the receiving facsimile machine 2 in S35. The command specifying procedure 3a then ends. However, if a command other than the forwarding command is specified in S31 (No in S32), then the specified command is transmitted to the receiving facsimile machine 2 in S36. The command specifying procedure 3a then ends.

1-4) Reception Procedure

Next a reception procedure 2a executed by the receiving facsimile machine 2 will be described with reference to Pig. 5.

The reception procedure 2a executed by the receiving facsimile machine 2 is initiated, when the receiving facsimile machine 2 realizes that connection is established with the transmitting facsimile machine 1. In S20, the receiving facsimile machine 2 first receives facsimile data, and stores the received facsimile data in the memory unit. After receiving the facsimile data, the receiving facsimile machine 2 waits in S21 until a command is received from the cellular phone 3. Once the command is received from the cellular phone 3 (Yes in S21), the receiving facsimile machine 2 executes a first command procedure S100. The reception procedure 2a then ends.

Figure 6:
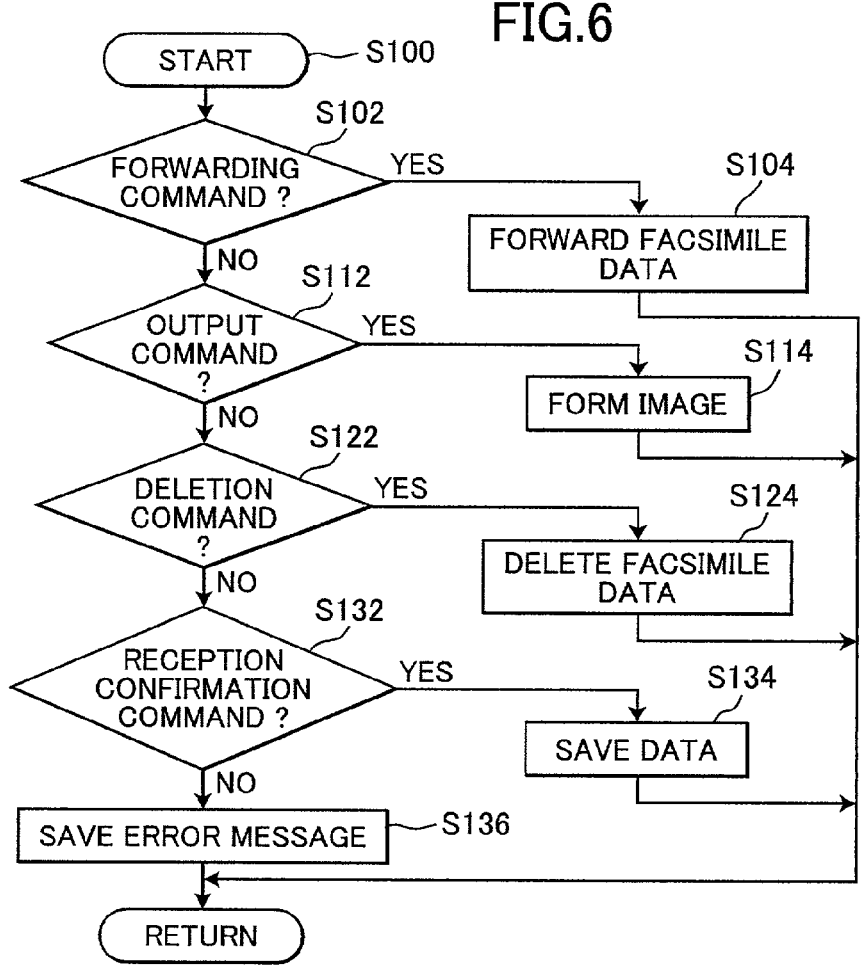
FIG. 6 is a flowchart illustrating a first command process executed by the receiving facsimile machine according to the first embodiment.

In the first command procedure S100 shown in FIG. 6, the receiving facsimile machine 2 determines in S102 whether a forwarding command for forwarding the received facsimile data to another facsimile machine has been received. If the forwarding command has been received (Yes in S102), go to in S104. In S04, the receiving facsimile machine 2 transmits the facsimile data stored in the memory to a destination facsimile machine designated with the facsimile number received along with the forwarding command. After forwarding the facsimile message, the first command procedure ends and the receiving facsimile machine 2 returns to the reception procedure 2a.

If the command is determined not to be the forwarding command (No in S102), the receiving facsimile machine 2 determines in S112 whether the command is an output command for forming an image based on the facsimile data on a sheet. If the output command has been received (Yes in S112), then go to S114. In S114, the receiving facsimile machine 2 forms an image on a sheet based on the facsimile data stored in the memory of the receiving facsimile machine 2. After forming the image on the sheet, the procedure S100 then ends and the receiving facsimile machine 2 returns to the reception procedure 2a.

If the output command was not received (No in S112), then the receiving facsimile machine 2 determines in S122 whether the command is a deletion command for deleting the received facsimile data. If the deletion command has been received (Yes in S122), then goes to S124. In S124, the receiving facsimile machine 2 deletes the facsimile data stored in the memory. The procedure S100 then ends and the receiving facsimile machine 2 returns to the reception procedure 2a.

If the command is determined not to be the deletion command (No in S122), then the receiving facsimile machine 2 determines in S132 whether the command is a reception confirmation command for confirming that facsimile data was received in the receiving facsimile machine 2. If the reception confirmation command has been received (Yes in S132), then goes to S134. In S134, the receiving facsimile machine 2 stores the received facsimile data to a storage, and sending back a message that the receiving facsimile machine 2 received the facsimile data. The procedure S100 then ends and the receiving facsimile machine 2 returns to the reception procedure 2a.

If the data saving command is not received (No in S132), then the receiving facsimile machine 2 saves the facsimile data together with an error message in the memory unit. The error message indicates that the received command is unclear for controlling the receiving facsimile machine 2. It should be noted that the receiving facsimile machine 2 temporally saves the received facsimile data with the error message for precautionary purposes because of the unclear command. Here, the procedure S100 ends, and the receiving facsimile machine 2 returns to the reception procedure 2a. In S136, the receiving facsimile machine 2 may transmit e-mail to the cellular phone 3 notifying the user that any recognizable command was not received at the receiving facsimile machine 2. The, the receiving facsimile machine may wait until another command is received. In this case, when a new command is received, the receiving facsimile machine 2 executes the process S100 again.

1-5) Effects

In the data transmission/reception system of the present embodiment, when the receiving facsimile machine 2 receives facsimile data from the transmitting facsimile machine 1, the receiving facsimile machine 2 executes one of a plurality of processes in response to a command transmitted via the Internet from the cellular phone 3 that received the notification mail 5. Here, the plurality of processes includes at least one of the following: the image-forming process (S114) for forming images on paper based on facsimile data, a deletion process (S124) for deleting the facsimile data received and stored in memory, and a data forwarding process (S104) for forwarding the facsimile data to another facsimile machine.

Hence, with the data transmission/reception system of the present embodiment, a user receiving the notification mail 5 can simply transmit a command to the receiving facsimile machine 2 to form an image based on the facsimile data with the receiving facsimile machine 2 (S114). In response to the command, the receiving facsimile machine 2 may delete the facsimile data stored in the memory of the receiving facsimile machine 2 (S124). Alternatively, the receiving facsimile machine may forward the data to another facsimile machine (S104). Accordingly, even when the user of the receiving facsimile machine 2 is not in the vicinity of the receiving facsimile machine 2, the user can still quickly view an image based on the facsimile data by transmitting a forwarding command to the receiving facsimile machine 2 instructing the receiving facsimile machine 2 to forward the facsimile data to another facsimile machine located around the user. When the user determines there is no particular necessity to forward the facsimile data, the recipient can transmit an output command or a deletion command to the receiving facsimile machine 2, instructing the receiving facsimile machine 2 to form an image of the data on paper or delete the facsimile data from the memory.

Since the command list 56 is included in the notification mail 5 in the data transmission/reception system of the present embodiment, the recipient can easily transmit a prescribed command from the cellular phone 3 by only selecting a desired command from the command list 56 in the notification mail 5 displayed on the screen of the cellular phone 3. Accordingly, the user can transmit commands with easy operations.

In the data transmission/reception system of the present embodiment, the notification mail 5 includes the thumbnail image 54 providing a small description of the facsimile data to be transmitted from the transmitting facsimile machine 1. Upon receiving the notification mail, therefore, the user can quickly determine whether the facsimile data received by the receiving facsimile machine 2 should be forwarded by only glancing at the thumbnail image 54.

2) Next, a Data transmission/reception system according to a second embodiment of the present invention will be described with reference to FIGS. 7 and 8, wherein like parts and components are designated by the same reference numerals to avoid duplicating description.

2-1) Overall Construction

Figure 7:
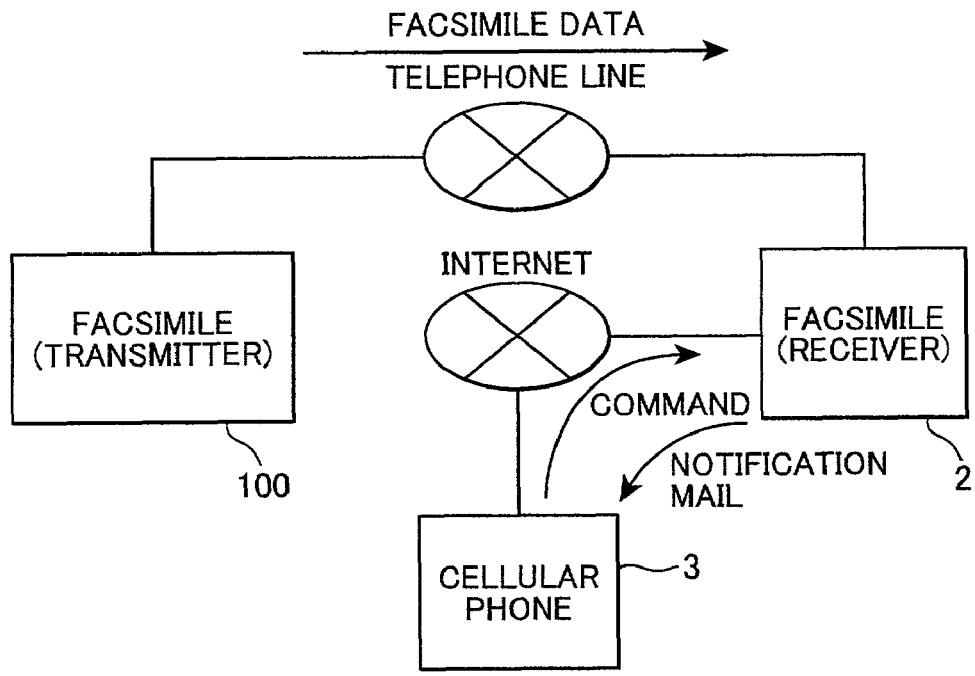
FIG. 7 is a block diagram showing the construction of a data transmission/reception system according to a second embodiment.
Figure 8:
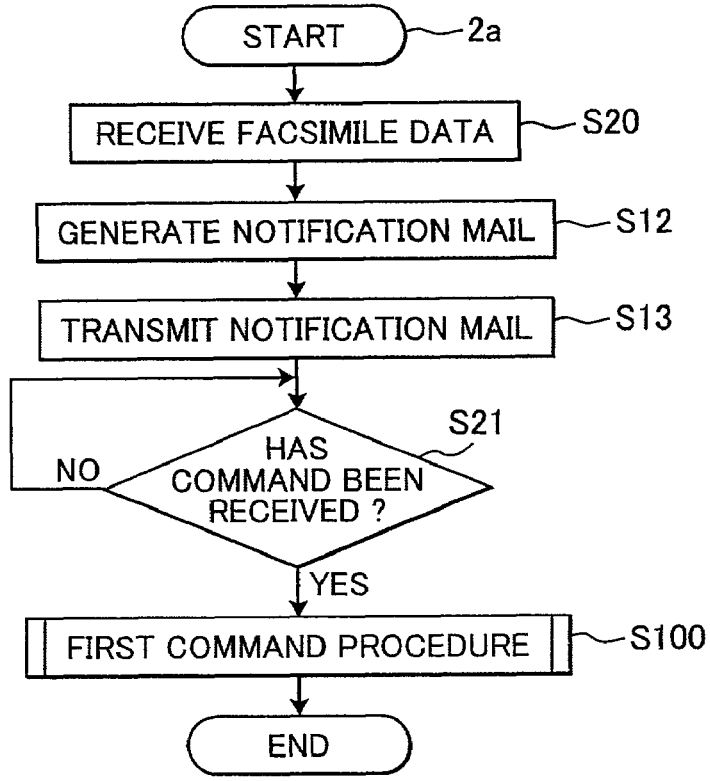
FIG. 8 is a flowchart illustrating a reception process executed by a receiving facsimile machine according to the second embodiment.

Referring to FIG. 7, the data transmission/reception system of the present embodiment comprises a conventional facsimile machine 100, a facsimile machine 2, and a cellular phone 3 connected to a telephone line. The facsimile machine 100 transmits facsimile data including image data via the telephone line as a transmitting facsimile machine. The facsimile machine 2 receives facsimile data transmitted via the telephone line as a receiving facsimile machine. The receiving facsimile machine 2 also transmits and receives e-mail via the Internet. The cellular phone 3 is capable of transmitting and receiving e-mail via the Internet.

The data transmission/reception system according to the present embodiment differs from that of the first embodiment in that the transmitting facsimile machine 1 does not have a function for sending/receiving email. The receiving facsimile machine 2 transmits notification mail after receiving the facsimile data. In this embodiment, the notification mail informs a user of the receiving facsimile machine 2 that the receiving facsimile machine 2 has received facsimile data.

In this embodiment, the transmitting facsimile machine 1 has the substantially same operations as those of a conventional facsimile machine. Therefore, the transmitting facsimile machine 1 starts sending facsimile data when connection with the receiving facsimile machine 2 is established. In addition, a command specifying procedure 3a executed by the cellular phone 3 is the same as the process described in the first embodiment except that the cellular phone 3 receives notification mail from the receiving facsimile machine 3. Therefore, a description of that procedure has been omitted here.

2-2) Reception Procedure A reception procedure 2a executed by the receiving facsimile machine 2 will be described with reference to FIG. 8.

The reception procedure 2a executed by the receiving facsimile machine 2 is initiated when the receiving facsimile machine 2 realizes that connection is established between the receiving facsimile machine 2 and the transmitting facsimile machine 1. In S20, the receiving facsimile machine 2 receives facsimile data and stores the received facsimile data in a memory provided in the receiving facsimile machine 2.

In S12, the receiving facsimile machine 2 executes a process to generate notification mail. In this process, the receiving facsimile machine 2 generates notification mail having a thumbnail image 54 corresponding to received facsimile data of the front page of the original. The receiving facsimile machine 2 further inserts a command list 56 into the notification mail. In the present embodiment, the notification mail may include the facsimile number of the transmitting facsimile machine 1, the name of the owner having the facsimile number, and the address and facsimile number of the receiving facsimile machine 2. The message 52, however, is not always included in the notification mail. The notification mail may include the message 52 related to the facsimile data, when the transmitting facsimile machine 1 has transmitted information related to the message 52 to the receiving facsimile machine 2.

In Sl3, the receiving facsimile machine 2 transmits the notification mail 5 generated in S12 to the cellular phone 3 of the user of the receiving facsimile machine 2 via the Internet. After transmitting the notification mail, the receiving facsimile machine 2 waits in S21 in order to receive a command from the cellular phone 3. Upon receiving a command from the cellular phone 3, the receiving facsimile machine 2 executes the first command procedure S100 shown in FIG. 6. After finishing the first command procedure S100, the reception procedure 2a of FIG. 8 ends.

2-3) Effects

In addition to the effects of the data transmission/reception system according to the first embodiment, the system according to the present embodiment has the following effects.

The data transmission/reception system of the first embodiment was configured such that the transmitting facsimile machine 1 executes a process (S12 and S13) to transmit notification mail, while the receiving facsimile machine 2 executes a facsimile data procedure (S100) based on the received commands. However, in the data transmission/reception system of the present embodiment, the receiving facsimile machine 2 performs both of these processes. Hence, the data transmission/reception system of the second embodiment can achieve the same effects as the system of the first embodiment, even when the transmitting facsimile machine 1 does not have a function to transmit the notification mail 5 or does not intentionally transmit the notification mail 5.

The present embodiment achieves the same effects as the data transmission/reception system of the first embodiment, even if the operator of the transmitting facsimile machine 1 does not know the address of the cellular phone 3 belonging to the receiver.

3) Next, a data transmission/reception system according to. a third embodiment of the present invention will be described with reference to FIGS. 9 through 13

In the following description, only points differing from those in the first embodiment will be described.

3-1) Overall Construction

Figure 9:
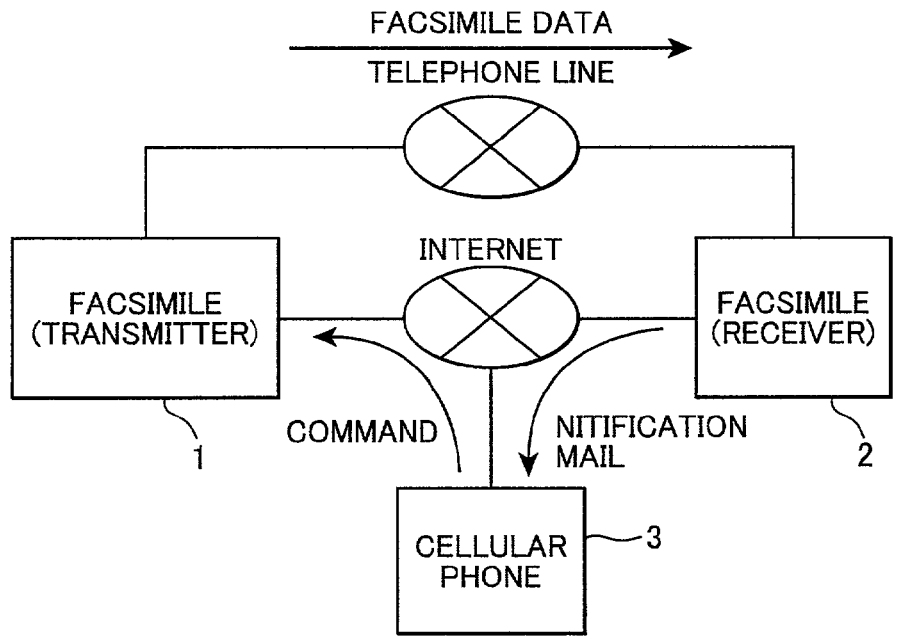
FIG. 9 is a block diagram showing the construction of a data transmission/reception system according to a third embodiment.

Referring to FIG. 9, the data transmission/reception system of the present embodiment includes at least two facsimile machines 1, 2 and a cellular phone connected to a telephone line. One of facsimile machines functions as a transmitting facsimile machine 1 for transmitting facsimile data via a telephone line, and receives command data via the Internet. The other of facsimile machines functions as a receiving facsimile machine 2 for receiving facsimile data via a telephone line. The receiving facsimile machine 2 is configured to transmit e-mail via the Internet. The cellular phone 3 is configured to send/receive e-mail via the Internet and also configured to transmit command data via the Internet.

In the data transmission/reception system of the present embodiment, when the receiving facsimile machine 2 realizes that connection with the transmitting facsimile machine 1 is established, the receiving facsimile machine 2 transmits notification mail to the cellular phone 3 in order to notify a user of the cellular phone 3 that facsimile data will be transmitted from the transmitting facsimile machine 1. After receiving the notification mail, the user of the cellular phone 3 specifies a command with the cellular phone 3. When the transmitting facsimile machine 1 receives this command from the cellular phone 3, the transmitting facsimile machine 1 starts transmitting facsimile data to the receiving facsimile machine 2.

3-2) Reception Process

Figure 10:
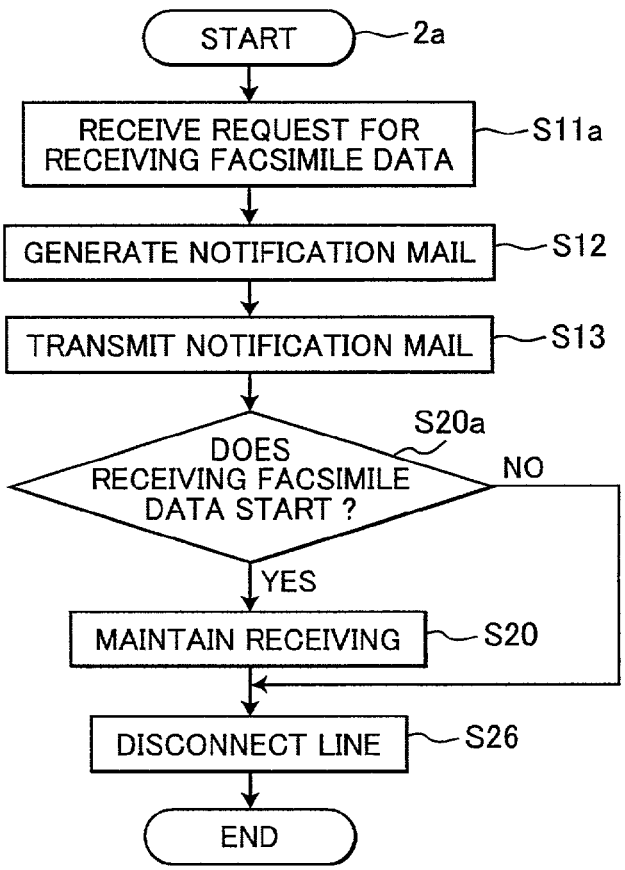
FIG. 10 is a flowchart illustrating a reception process executed by a receiving facsimile machine according to the third embodiment.

Next, the reception procedure executed by the receiving facsimile machine 2 will be described with reference to FIG. 10.

The reception procedure 2a is initiated when the receiving facsimile machine 2 establishes connection with the transmitting facsimile machine 1. In general, the transmitting facsimile machine 1 sends a request signal indicating a request for the receiving facsimile machine 2 to receive facsimile data from the transmitting facsimile machine 1. In S11a, the receiving facsimile machine 2 receives the request signal from the transmitting facsimile machine 1. In S12, in response to the requesting signal, the receiving facsimile machine 2 generates notification mail for notifying the cellular phone 3 that facsimile data will be transmitted from the transmitting facsimile machine 1. In the process of S12, the notification mail is created in order to include data 50 such as the facsimile number of the operator who transmits facsimile data, and a command list 56 including a transmission command for instructing the transmitting facsimile machine 1 to transmit the facsimile data, a transmission canceling command for canceling the transmission of facsimile data, and a forwarding command for forwarding the facsimile data to a facsimile machine other than the receiving facsimile machine 2.

In S13, the receiving facsimile machine 2 transmits the generated notification mail to the cellular phone 3 via the Internet. Subsequently, in S20a, the receiving facsimile machine 2 determines whether the reception of facsimile data has begun within a predetermined time period after receiving the request signal. If the reception has begun (Yes in S20a), then the receiving facsimile machine 2 maintains receiving the facsimile data in S20. After the reception of the facsimile data in S20 has completed, the connection with the transmitting facsimile machine 1 is disconnected in S26. The reception procedure 2a then ends. If the reception of facsimile data does not begin within the predetermined time period (No in S20a), then go to S26. In S26, the connection with the transmitting facsimile machine 1 is disconnected. The reception procedure 2a then ends.

3-3) Command Specifying Process

Figure 11:
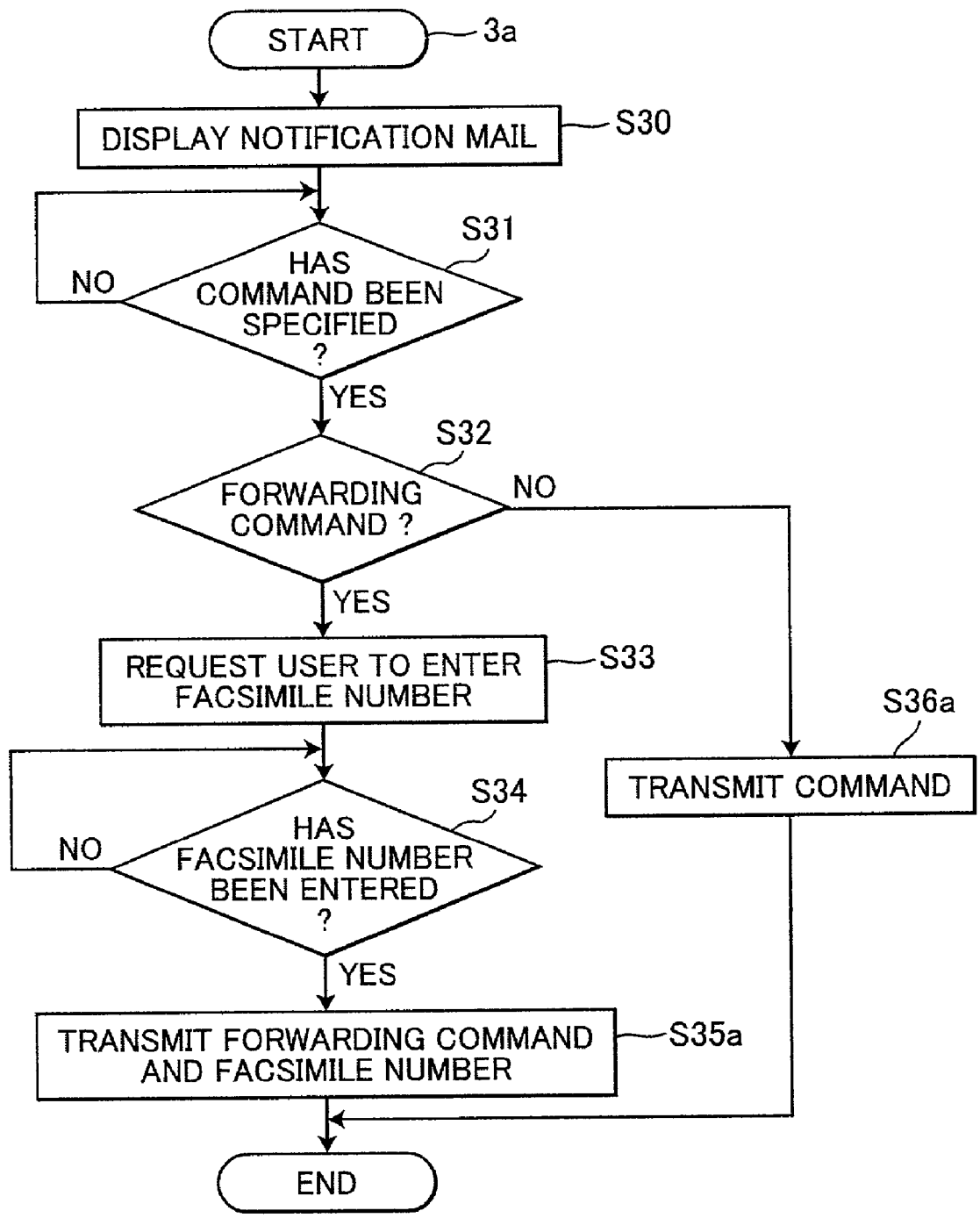
FIG. 11 is a flowchart illustrating a command specifying process executed by a cellular phone according to the third embodiment.
Figure 12:
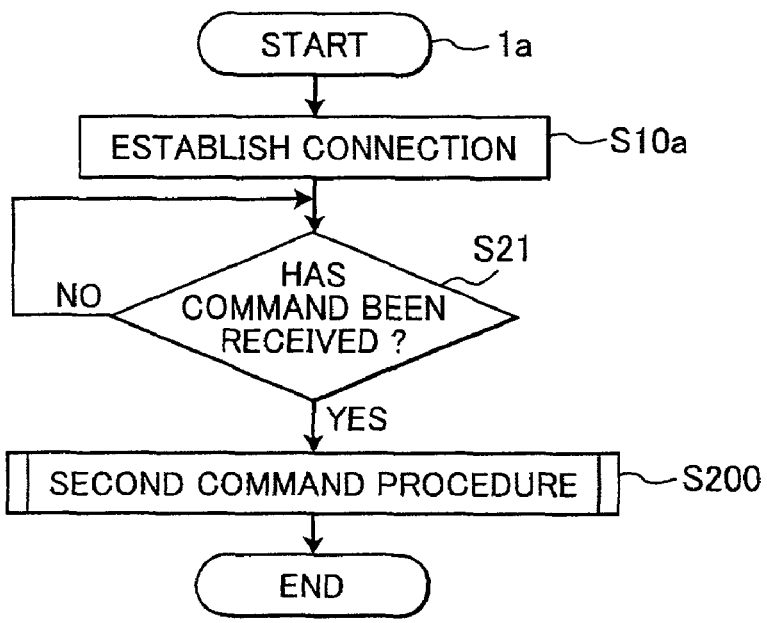
FIG. 12 is a flowchart illustrating a transmission process executed by a transmitting facsimile machine according to the third embodiment.

A command specifying process 3a executed by the cellular phone 3 will be described with reference to FIG. 11.

The command specifying process 3a is initiated when the cellular phone 3 receives the notification mail 5. In S30, the cellular phone 3 displays the notification mail 5 on the display screen of the cellular phone 3. In S31, the cellular phone 3 waits until the user of the cellular phone 3 specifies one of the commands in the command list 56 displayed on the notification mail 5 with buttons on the cellular phone 3. When the user has specified a command (Yes in S31), then the cellular phone 3 determines in S32 whether the user has specified a forwarding command. If the cellular phone 3 determines that the forwarding command has been specified (Yes in S32), then the cellular phone 3 displays a request for the user to enter the facsimile number of the forwarding destination in S33. In S34, the cellular phone 3 waits until the facsimile number is entered. When the facsimile number has been inputted (Yes in S34), then the cellular phone 3 transmits the inputted facsimile number together with the forwarding command to the transmitting facsimile machine 1 in S35a. The command specifying procedure 3a then ends. However, if the cellular phone 3 determines that a command other than the forwarding command has been specified in S31 (No in S32), then the cellular phone 3 transmits the command to the transmitting facsimile machine 1 in S36a and the command specifying process 3a ends, 3-4) Transmission Process Next, the transmission process executed by the transmitting facsimile machine 1 will be described with reference to FIG. 12.

The transmission process 1a is initiated when the transmitting facsimile machine 1 starts transmitting facsimile data to the receiving facsimile machine 2. In S10a, the transmitting facsimile machine 1 establishes connection with the receiving facsimile machine 2, and transmits a request signal to the receiving facsimile machine 2 which request the receiving facsimile machine 2 to receive facsimile data. The transmitting facsimile machine 1 can be configured such that the user can either select a facsimile number of the receiving facsimile machine 2 prestored in the transmitting facsimile machine 1 or enter the facsimile number directly by pushing dialing buttons prior to switching on the start button. In S21, the transmitting facsimile machine 1 waits until a command has been received from the cellular phone 3, when the command has been received from the cellular phone 3 (Yes in S21), the transmitting facsimile machine 1 executes the second command procedure S200, and the transmission process 1a ends.

Figure 13:
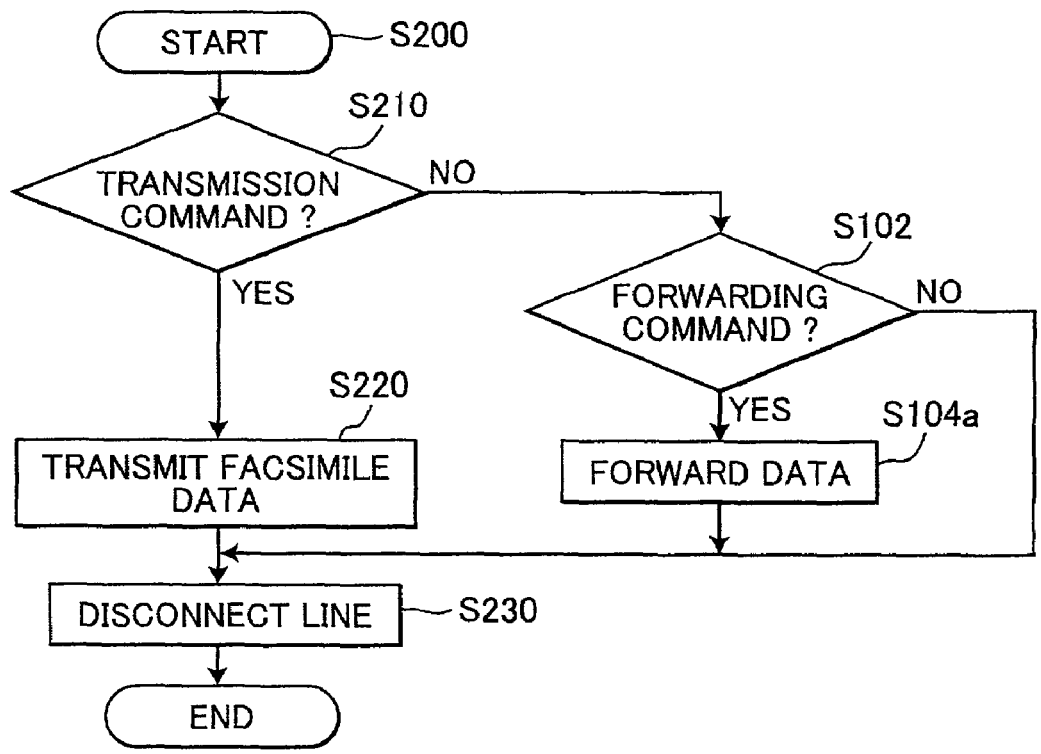
FIG. 13 is a flowchart illustrating a second command process according to the third embodiment.

Next, the second command procedure S200 will be described with reference to FIG. 13. In S210, the transmitting facsimile machine 1 determines whether the command received from the cellular phone 3 is a transmission command for transmitting facsimile data. If the received command is the transmission command (Yes in S210), then the transmitting facsimile machine 1 executes a process to transmit facsimile data in S220. In the process of S220, the transmitting facsimile machine 1 creates facsimile data by scanning the image on the original with a scanner provided in the transmitting facsimile machine 1. The transmitting facsimile machine 1 then transmits the facsimile data to the receiving facsimile machine 2 via the telephone line. When the process of S220 is completed, the transmitting facsimile machine 1 disconnects the telephone line in S230 and the process returns to the transmission procedure 1a. However, if the transmitting facsimile machine 1 determines that the received command is not the transmission command (No in S210), then the transmitting facsimile machine 1 determines in S102 whether the received command is a forwarding command for forwarding facsimile data to other facsimile machine than the facsimile machine 2. If the command is the forwarding command (Yes in S102), then the transmitting facsimile machine 1 disconnects the telephone line with the receiving facsimile machine 2 in S104a. The transmitting facsimile machine 1 calls the facsimile machine designated by the number of the forwarding destination in the forwarding command, thereby establishing connection with that facsimile machine. The transmitting facsimile machine 1 then transmits the facsimile data to the facsimile machine at this destination address. After finishing the forwarding facsimile data, in S230, the transmitting facsimile machine 1 disconnects the telephone line with the destination address, and returns the process to the transmission procedure 1a. However, if the command is determined not to be a forwarding command (No in S102), then the transmitting facsimile machine 1 concludes that the command is a transmission canceling command. The transmitting facsimile machine 1 then immediately disconnects in S230 the telephone line that was connected in S10, and returns to the transmission procedure 1a.

3-5) Effects

In the data transmission/reception system of the present embodiment, when connection is established between the transmitting facsimile machine 1 and the receiving facsimile machine 2, the receiving facsimile machine 2 confirms a request from the transmitting facsimile machine 1 to receive facsimile data from the transmitting facsimile machine 1. The receiving facsimile machine 2 then transmits via the Internet a notification mail to the cellular phone 3 of the user of the receiving facsimile machine 2, indicating that the transmitting facsimile machine 1 will transmit facsimile data to the receiving facsimile machine 2 soon.

After the transmitting facsimile machine 1 establishes a communication line with the receiving facsimile machine 2 via a telephone line and sends a request for the receiving facsimile machine 2 to receive facsimile data, the transmitting facsimile machine 1 selectively executes one of a plurality of processes in response to a command received from the cellular phone 3 via the Internet. The plurality of processes includes at least one of the following processes: a transmission process (S220) for transmitting facsimile data to the receiving facsimile machine 2, a transmission canceling process (a process for directly executing the S230 via the S210 and S102) for canceling the transmission of facsimile data to the receiving facsimile machine 2, and a data forwarding process (S104a) to forward the facsimile data to another facsimile machine.

Accordingly, using the data transmission/reception system of the present embodiment, the user can transmit a command to the transmitting facsimile machine 1 to cancel the transmission of facsimile data after viewing the notification mail and determining that it is not necessary to view the facsimile data, thereby avoiding unnecessary transfers. As a result, the present invention can reduce the amount of traffic for transmitting facsimile data and avoid the wasting of paper.

With the data transmission/reception system of the present embodiment, when the use of the receiving facsimile machine 2 is not in the vicinity of the receiving facsimile machine 2, the user can transmit a forwarding command to the transmitting facsimile machine 1 instructing the transmitting facsimile machine 1 to forward the facsimile data to another facsimile machine which is located near the user. In this way, the user can quickly view an image based on the facsimile data.

With the data transmission/reception system of the present embodiment, the notification mail 5 includes the command list 56. After receiving the notification mail 5 with the cellular phone 3, the user can select a desired command from the command list 56 displayed in the notification mail 5. The cellular phone 3 is configured to transmit the selected command, thereby enabling the user to transmit a command with an extremely simple operation.

With the data transmission/reception system of the present embodiment, the notification mail 5 includes a forwarding command. If the transmitting facsimile machine 1 receives a forwarding command, the transmitting facsimile machine 1 can forward facsimile data to a destination address specified along with the command.

4) A data transmission/reception system according to a fourth embodiment of the present invention will be described with reference to FIGS. 14 and 15. In the following description, only the points that differ from the description of the third embodiment will be described.

4-1) Overall Construction

Figure 14:
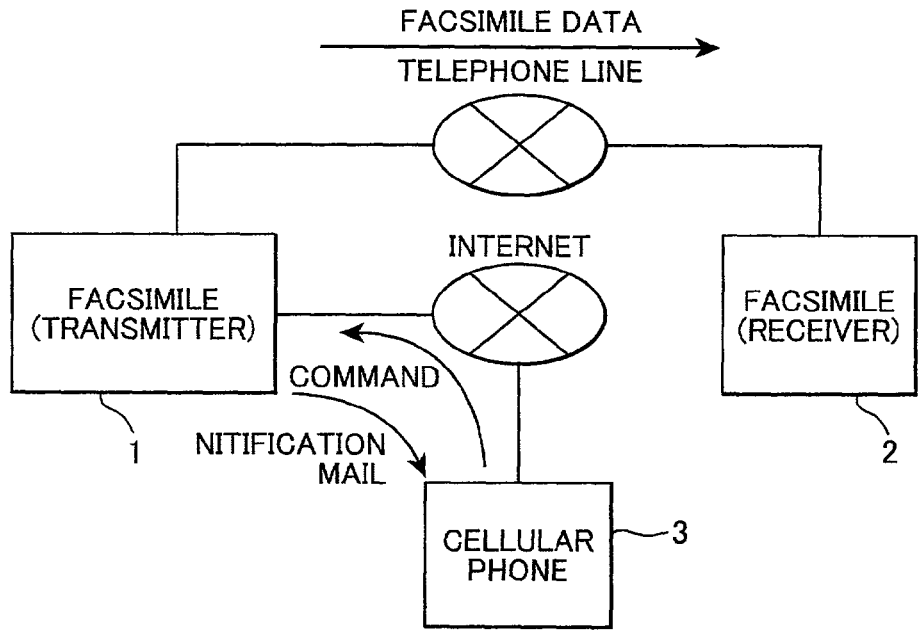
FIG. 14 is a block diagram showing the construction of a data transmission/reception system according to a fourth embodiment.
Figure 15:
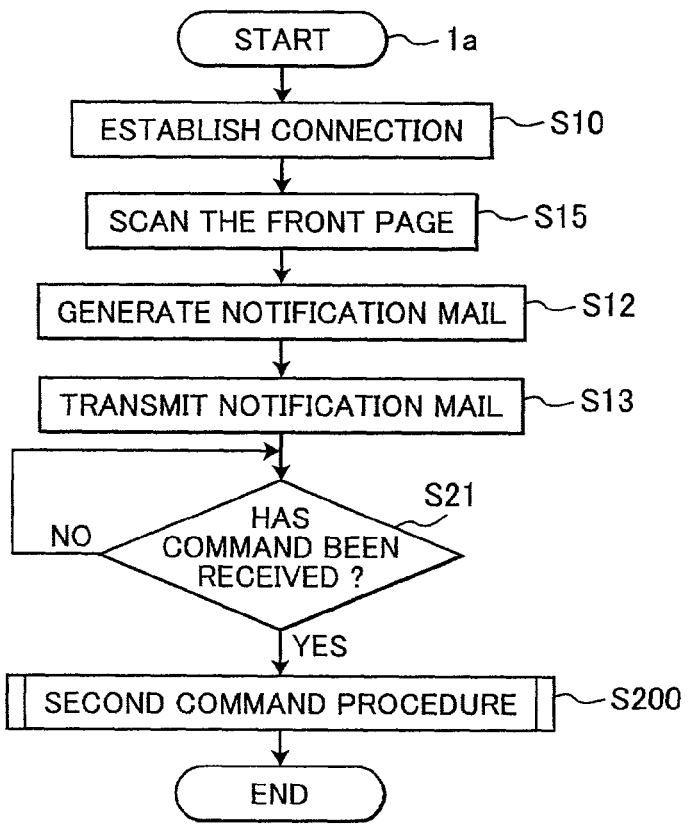
FIG. 15 is a flowchart illustrating a transmission process executed by a transmitting facsimile machine according to the fourth embodiment.

As shown in FIG. 14, the data transmission/reception system of the present embodiment, comprises a transmitting facsimile machine 1 that is capable of transmitting e-mail via the Internet and is also capable of transmitting facsimile data composed of image data via a telephone line; a normal receiving facsimile machine 2 that is capable of transmitting facsimile data via a telephone line; and a cellular phone 3 that is capable of receiving e-mail via the Internet and is also capable of transmitting command data via the Internet.

In this embodiment, one of the operations of the system which are different from the third embodiment is that the transmitting facsimile machine 1 transmits notification mail prior to beginning the transmission of facsimile data. The command specifying procedure executed by the data transmission/reception system is the same as that described in the third embodiment. Therefore, a description of this procedure has been omitted.

4-2) Transmission Process

Next, a transmission process executed by the transmitting facsimile machine 1 will be described with reference to FIG. 15.

A transmission procedure 1a is initiated when the transmitting facsimile machine 1 starts transmitting image. In S10, the transmitting facsimile machine 1 starts establishing a telephone line connection with the receiving facsimile machine 2. Here, the transmitting facsimile machine 1 can be configured such that the user specifies a facsimile number for the receiving facsimile machine 2 that is prestored in the receiving facsimile machine 2 or specifies the facsimile number directly using dialing buttons on the receiving facsimile machine 2 prior to switching on the start button for transmission.

In S15, the transmitting facsimile machine 1 reads one page of the original (the front page) using a scanner provided in the transmitting facsimile machine 1. In S12, the transmitting facsimile machine 1 generates notification mail with a thumbnail that is created based on facsimile data read in S15. In addition to the facsimile number of the transmitting facsimile machine 1 or the name of the sender 50 and a message 52, the notification mail 5 includes a thumbnail image 54 based on facsimile data read in S15 and a command list 56. Unlike the notification mail 5 described in FIG. 3, however, the command list 56 does not include a transmission command, transmission cancellation command, and forwarding command. In S13, the transmitting facsimile machine 1 transmits the notification mail 5 generated in S15 to the cellular phone 3.

In S21, the transmitting facsimile machine 1 waits until a command is received from the cellular phone 3 to which the notification mail was transmitted. When a command is received (Yes in S21), then the transmitting facsimile machine 1 executes the second command procedure S200, and the transmission process 1a ends.

4-3) Effects

In addition to the effects described in the third embodiment, the data transmission/reception system according to the present embodiment has the following effects:

The data transmission/reception system of the present embodiment adds functions to the transmitting facsimile machine 1: a function to transmit notification mail (S12 and S13); a function to transmit facsimile data; and a function to cancel transmission of facsimile data. On the other hand, the receiving facsimile machine 2 do not have to include any specific function except the function for sending facsimile data. The data transmission/reception system of the present embodiment achieves the same effects as the data transmission/reception system of the third embodiment.

The data transmission/reception system of the present embodiment includes the thumbnail image 54 based on facsimile data for the front page of the original in the notification mail 5, enabling the user receiving the notification mail 5 to confirm at a glance what type of facsimile data will be transmitted. Therefore, the user can immediately determine whether the facsimile data needs to be transmitted or not, or whether it is necessary to forward the facsimile data.

5) Next, a data transmission/reception system according to a fifth embodiment of the present invention will be described with reference to FIGS. 16 and 17.

In the following description, the command specifying procedure 3a executed by the cellular phone 3 and the reception procedure 2a executed by the receiving facsimile machine 2 have the same processes of the data transmission/reception system in the first embodiment. Therefore, the following description will include only the points differing from the first embodiment, focusing on the processes of the relay facsimile machine 4.

5-1) Overall Construction

Figure 16:
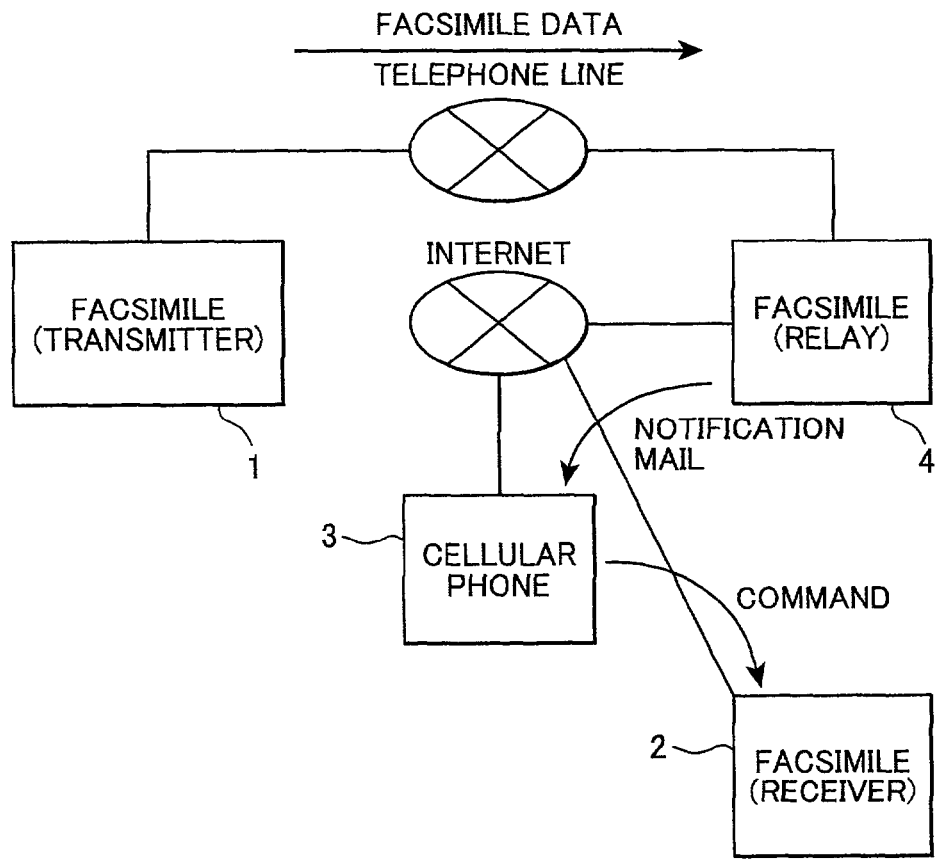
FIG. 16 is a block diagram showing the construction of a data transmission/reception system according to a fifth embodiment.
Figure 17:
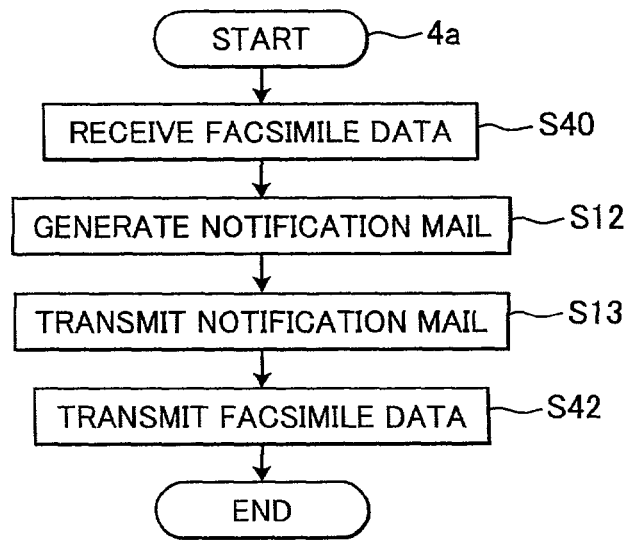
FIG. 17 is a flowchart illustrating a relay process executed by a relay facsimile machine according to the fifth embodiment.

As shown in FIG. 16, the data transmission/reception system of the present embodiment comprises a normal transmitting facsimile machine 1 that is capable of transmitting facsimile data composed of image data via a telephone line; a relay facsimile machine 4 that is capable of transmitting e-mail via the Internet and is also capable of transmitting and receiving facsimile data via a telephone line; a normal receiving facsimile machine 2 that is capable of receiving command data via the Internet and is also capable of receiving facsimile data via a telephone line; and a cellular phone 3 that is capable of receiving e-mail via the Internet and is also capable of transmitting command data via the Internet. It should be noted that the cellular phone 3 is owned by a user of the receiving facsimile machine 2.

In this embodiment, the relay facsimile machine 4 transmits notification mail to the cellular phone 3 after receiving facsimile data from the transmitting facsimile machine 1. The relay facsimile machine 4 also transmits the facsimile data to the receiving facsimile machine 2. After receiving the notification mail, the receiver specifies a command with the cellular phone 3. The receiving facsimile machine 2 receives the command from the cellular phone 3. The receiving facsimile machine 2 then either forms an image based on facsimile data received from the transmitting facsimile machine 1 or forwards the received facsimile data to another facsimile machine near the receiver based on the received command.

5-2) Relay Process

A relay process executed by the relay facsimile machine 4 will be described next.

A relay procedure 4a is initiated after connection is established between the relay facsimile machine 4 and the transmitting facsimile machine 1. In S40, the relay facsimile machine 4 receives facsimile data from the transmitting facsimile machine 1, stores the received data in memory provided in the receiving facsimile machine 2, and disconnects the telephone line after the reception has completed.

In S12, the relay facsimile machine 4 generates notification mail. In this process, the relay facsimile machine 4 creates a notification mail 5 including the telephone number of the sender 50, a thumbnail image 54 based on facsimile data corresponding to the front page of the received facsimile data, and a command list 56. In S13, the relay facsimile machine 4 transmits the generated notification mail 5 to the cellular phone 3 via the Internet.

In S42, the relay facsimile machine 4 executes a process to open a telephone line with the receiving facsimile machine 2, transmit the facsimile data stored in memory to the receiving facsimile machine 2, and disconnect the telephone line connection after the data has been completely transmitted. The relay process 4a ends.

5-3) Effects

When the relay facsimile machine 4 receives facsimile data transmitted from the transmitting facsimile machine 1, the relay facsimile machine 4 forwards this facsimile data to the receiving facsimile machine 2, and also transmits notification mail to the cellular phone 3 of the user via the Internet indicating that facsimile data has been relayed to the receiving facsimile machine 2.

Accordingly, by specifying a destination address when the transmitting facsimile machine 1 transmits facsimile data to the relay facsimile machine 4, the relay facsimile machine 4 can relay received facsimile data to the receiving facsimile machine 2 at the specified destination address. Further, the relay facsimile machine 4 notifies the user by notification mail indicating what type of facsimile data was forwarded. Accordingly, the receiver can view an image based on the facsimile data forwarded to the destination in the notification mail.

With the data transmission/reception system of the present embodiment, as in the data transmission/reception system of the first embodiment, the user can either form an image based on the facsimile data with the receiving facsimile machine 2, or forward the facsimile data to another facsimile machine simply by transmitting a command to the receiving facsimile machine 2 after receiving the notification mail. Accordingly, the present invention enables the user to flexibly handle the facsimile data. More specifically, when the receiver of the facsimile data is not in the vicinity of the receiving facsimile machine 2, the receiver can always view an image based on the facsimile data quickly by transmitting a command instructing the receiving facsimile machine 2 to forward the facsimile data to another facsimile device. If the receiver determines that the facsimile data need not be forwarded, the user can instruct the receiving facsimile machine 2 to form an image of the facsimile data on paper.

The notification mail 5 includes the command list 56 in the data transmission/reception system of the present embodiment. Hence, when the receiver receives the notification mail 5 by the cellular phone 3, the receiver can select a desired command from the command list 56 displayed in the notification mail 5 and transmit this command from the cellular phone 3. Accordingly, the receiver can transmit commands by extremely simple operations involving only specifying a command from the command list 56 displayed in the notification mail 5.

In the data transmission/reception system of the present embodiment, the notification mail 5 includes the thumbnail image 54 as a small representation of the facsimile data relayed by the relay facsimile machine 4. After receiving the notification mail, the receiver can view at a glance what type of facsimile data was forwarded, Hence, the receiver can immediately determine whether the forwarded facsimile data is important or not.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiments described above, the notification mail 5 displaying the thumbnail image 54 and the command list 56 is transmitted to the cellular phone 3 of the receiver. However, it is also possible to transmit a notification mail 5 displaying only the address of a web server supplying the thumbnail image 54 and command list 56. In this case, the receiver uses the cellular phone 3 to access the web server at that address and specify one of the commands in the command list 56. The specified command is transmitted to the receiving facsimile machine 2 from the web server.

With this configuration, it is possible to create a very simple notification mail 5 that includes only a web address, thereby simplifying the process for creating the notification mail 5. Further, the receiver of the notification mail 5 can perform simple command operations that involve only connecting to the web server and indicating one of the commands displayed thereon. The web server can be provided with the functions of the transmitting facsimile machine 1, receiving facsimile machine 2, and relay facsimile machine 4. If these facsimile machines are connected to a LAN or the like, the machines can also be provided in the LAN server or the like. It is also obvious that these facsimile devices may also be provided in the general server of a provider or the like.

In the embodiments described above, facsimile data is transmitted via a telephone line. However, it is obvious that the facsimile data can be attached to an e-mail message and transmitted via the Internet. Further, an image for the front page is attached to the notification mail as a thumbnail image. However, the system can be configured to attach a thumbnail image for each page or a plurality of thumbnail images for a predetermined number of pages to the notification mail.

In the embodiments described above, the cellular phone 3 is described as the device that receives the notification mail. However, this device can also be a portable computer having a communication function. Obviously the address of the notification mail can be freely changed.

Figure 18:
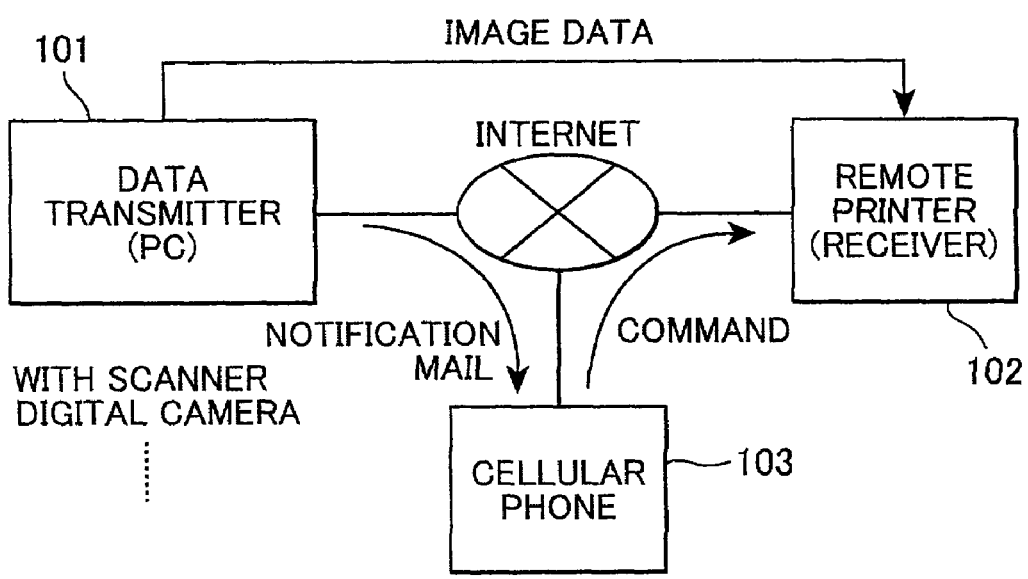
FIG. 18 is a block diagram showing the construction of a data transmission/reception system according to a sixth embodiment.

In the embodiments described above, image data is transmitted through the telephone line. However, it is in the scope of the invention to provide a system wherein image data obtained by a scanner, a digital camera, or a video camera is transmitted through a communication network such as the Internet. A system of a sixth preferred embodiment will be described in conjunction with FIG. 18 as follow:

Referring to FIG. 18, the system comprises a data transmitter 100, a remote printer 102, and a cellular phone 103 connected to the Internet.

The data transmitter 101 has an image reading unit for reading an image to produce image data, and a transmitting unit for transmitting the image data to the Internet. The image reading unit may consist of a scanner, a digital camera, or a video camera.

The remote printer 102 has a receiving unit for receiving the image data transmitted over the Internet, and a printing unit for forming an image based on the received image data on a sheet. Both of the transmitter 101 and the printer 102 are capable of sending/receiving email through the Internet. Generally, the cellular phone 103 is a communication terminal owned by a user of the remote printer 102.

With the above configuration, the transmitter 101 transmits image data to the printer 102 over the Internet, and simultaneously transmits notification mail to the cellular phone 103. The mail including a notification message informs the user of the cellular phone 103 that image data has been transmitted by the transmitter 101 to the remote printer 102.

When the cellular phone 103 receives the notification mail, the user realizes that the image data has been transmitted to the remote printer 102. The user specifies a command to the remote printer 102 by using the cellular phone 103. And the specified command is sent to the remote printer 102. When receiving the command from the cellular phone 103, the remote printer 102 operates in response to the command. The remote printer 102 may form images based on the image data received from the transmitter 101. Alternatively, the remote printer 102 may forward the received data to another printer which is able to communicate with the remote printer 102, or delete the received image data from the remote printer 102. That is, the operations of the sixth embodiment are similar to those of the first embodiment except that image data is transmitted through the Internet.

The sixth embodiment has the same advantages as those of the first embodiment.

What is claimed is:

1. A data transmission/reception system, comprising:
an image-forming device having a storage device, the image-forming device receiving image data to form an image based on the image data on a recording medium;
a data transmitter that transmits image data to the image-forming device via a data transmission network and then transmits a notification message via a mail communication network, the image data being transmitted to the image-forming device without having a password, the notification message indicating that the image data has been transmitted to the image-forming device and the image-forming device is waiting for instructions whether to form an image based on the image data; and
a communication terminal that provides a plurality of optional processes to be selected, the plurality of processes including at least two of an image-forming process that forms an image based on the image data, a data deletion process that deletes the image data from the storage device, and a data forwarding process that forwards the image data to another image-forming device, wherein
the communication terminal receives the notification message and, in response to the notification message, issues the instructions whether to form an image based on the image data by selecting one of the provided plurality of processes for the image-forming device,
the communication terminal transmits the instructions to the image forming device via a command communication network and
the image-forming device executes the process selected by the instructions without requiring entry of the password.

2. The data transmission/reception system according to claim 1, wherein the data transmitter comprises:
an image data transmission device that transmits image data to the image-forming device via the data transmission network; and
a notification message transmission device that transmits the notification message to the intended recipient via the mail communication network.

3. The data transmission/reception system according to claim 1, wherein the image-forming device comprises:
an image data receiving device that receives image data transmitted from the data transmitter via the data transmission network;
a command receiving device that receives the instructions; and
an image data forming device that selectively executing one of the plurality of processes.

4. A data transmission/reception system comprising:
an image-forming device that forms images on a recording medium based on image data;
a data transmitter for transmitting the image data to the image-forming device via a data transmission network, the image data being transmitted to the image-forming device without having a password; and
a communication terminal configured to communicate with the image-forming device, wherein
the communication terminal provides a plurality of optional processes to be selected, the plurality of processes including at least two of an image-forming process that forms an image based on the image data, a data deletion process that deletes the image data from the storage device, and a data forwarding process that forwards the image data to another image-forming device, the image-forming device receives the image data and then transmits a notification message via a mail communication network to the communication terminal, the notification message indicating that the image data has been received and the image-forming device is waiting for instructions whether to form an image based on the image data, the communication terminal, in response to the notification message, issues the instructions whether to form an image based on the image data by selecting one of the provided plurality of processes for the image-forming device, the communication terminal transmits the instructions to the image-forming device via the command communication network, and the image-forming device executes the selected process in response to the instructions without requiring entry of the password.

5. The data transmission/reception system according to claim 4, wherein the image-forming device comprises:

an image data receiving device that receives the image data transmitted from the data transmitter via the data transmission network;

a notification message transmitting device that transmits the notification message via the mail communication network to the communication terminal of the intended recipient;

a command receiving device that receives the instructions transmitted from the communication terminal after the notification message transmitting device transmits the notification message; and an image data forming device that selectively executes one of the plurality of processes without requiring entry of the password.

6. A system for sending/receiving an image through a telephone line, comprising:

a first facsimile device that sends/receives the image through the telephone line;

a second facsimile device that sends/receives the image through the telephone line; and a terminal connected to a communication network, the terminal providing a plurality of optional instructions to be selected, the plurality of instructions including at least two of forming the image on a sheet at the second facsimile device, forwarding the received image to another facsimile device, and deleting the received image from the second facsimile device, wherein one of the first and second facsimile devices having a communication unit that communicates with the terminal over the communication network, and wherein when the first facsimile device sends the image to the second facsimile device, the image being sent without having a password, the communication unit sends a notification message to the terminal, the notification message indicating that the first facsimile device has sent the image to the second facsimile device and the image-forming device is waiting for an instruction whether to form an image based on the image data, the terminal sends the instruction by selecting from the provided plurality of instructions for operating the second facsimile device, in response to the notification message, and the second facsimile device executes the selected instruction without requiring entry of the password.

7. The system according to claim 6, wherein one of the first and the second facsimile devices comprise:

a notification message transmitting device that transmits the notification message via the communication network to the communication terminal; and a command receiving device that receives the instructions transmitted via the communication network from the communication terminal; and the second facsimile device comprises an image data processing device that selectively executes one of the plurality of processes.

8. The system according to claim 6, wherein the notification message includes a plurality of instructions for operating the second facsimile device, the plurality of instructions are selectable by a user of the terminal.

9. The system according to claim 6, wherein the notification message includes a Web server address which is connectable to a Web server by the user, and wherein the instruction for the facsimile device receiving the image is provided from the Web server.

10. The system according to claim 6, wherein the notification message includes a thumbnail image corresponding to a front page of the images.

11. A method for processing image data, comprising:

transmitting image data from a data transmitter to an image-forming device via a data communication network without having a password;

transmitting a notification message from the data transmitter to a communication terminal via a mail communication network, the notification message indicating that the image data has been transmitted to the image-forming device and the image-forming device is waiting for instructions whether to form an image based on the image data;

providing a plurality of optional processes to be selected, the plurality of processes including at least two of an image-forming process that forms an image based on the image data, a data deletion process that deletes the image data from the storage device, and a data forwarding process that forwards the image data to another image-forming device;

providing the instructions whether to form an image based on the image data by selecting one of the provided plurality of processes for the image-forming device in response to the notification message at the communication terminal, and transmitting the instructions to the image-forming device via a command communication network, executing the process selected by the instructions without requiring entry of the password.

12. A method for processing image data, comprising:

transmitting image data from a data transmitter to an image-forming device via a data communication network without having a password;

transmitting a notification message from the image-forming device to a communication terminal via a mail communication network, the notification message indicating that the image data has been received and the image-forming device is waiting for instructions whether to form an image based on the image data;

providing a plurality of optional processes to be selected, the plurality of processes including at least two of an image-forming process that forms an image based on the image data, a data deletion process that deletes the image data from the storage device, and a data forwarding process that forwards the image data to another image-forming device;

providing the instructions whether to form an image based on the image data by selecting one of the provided plurality of processes for the image-forming device in response to the notification message at the communication terminal;

transmitting the instructions to the image-forming device via a command communication network;

executing the selected process at the image-forming device in response to the instructions without requiring entry of the password.

13. A method for processing image data, comprising:

transmitting image data from a first facsimile device to a second facsimile device through a telephone line;

transmitting a notification message from one of the first and second facsimile devices to a communication terminal, the notification message indicating that the first facsimile device has transmitted the image data to the second facsimile device and the image-forming device is waiting for instructions whether to form an image based on the image data;

providing a plurality of optional processes to be selected, the plurality of processes including at last two of forming an image based on the image data at the second facsimile device, forwarding the image data to another facsimile device, and deleting the image data from the second facsimile device;

providing the instructions whether to form an image based on the image data by selecting, in response to the notification message, one of the provided plurality of processes for the second facsimile device at the communication terminal;

transmitting the instructions to the one of the first and second facsimile device; and in response to the instructions, executing the selected process at the second facsimile device without requiring entry of a password.

* * * * *